(12) United States Patent
Subramanian

(10) Patent No.: US 11,094,027 B2
(45) Date of Patent: Aug. 17, 2021

(54) SYSTEM AND METHOD TO ESTABLISH PRIMARY AND SECONDARY CONTROL OF RIDESHARE EXPERIENCE FEATURES

(71) Applicant: GM GLOBAL TECHNOLOGY OPERATIONS LLC, Detroit, MI (US)

(72) Inventor: Vijayasarathy Subramanian, Virudhunagar (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 167 days.

(21) Appl. No.: 16/376,199

(22) Filed: Apr. 5, 2019

(65) Prior Publication Data

US 2020/0320655 A1    Oct. 8, 2020

(51) Int. Cl.
| | |
|---|---|
| *G06Q 50/30* | (2012.01) |
| *G06Q 10/02* | (2012.01) |
| *G05D 1/02* | (2020.01) |
| *B60R 16/037* | (2006.01) |
| *B60N 2/02* | (2006.01) |

(52) U.S. Cl.
CPC ............ *G06Q 50/30* (2013.01); *G06Q 10/02* (2013.01); *B60N 2/0244* (2013.01); *B60R 16/037* (2013.01); *G05D 1/0276* (2013.01)

(58) Field of Classification Search
CPC .......... G08G 1/20; G08G 1/202; G06Q 50/30; G06Q 10/02; G06Q 2240/00; B60N 2/0244; B60R 16/037; B60R 16/03; G05D 1/0287; G05D 1/0276
See application file for complete search history.

(56) References Cited

U.S. PATENT DOCUMENTS

| | | | |
|---|---|---|---|
| 9,971,348 B1* | 5/2018 | Canavor et al. ...... | G05D 1/0212 |
| 10,131,300 B2* | 11/2018 | Mullett ................. | B60R 16/037 |
| 10,970,747 B2* | 4/2021 | Miller ................ | G06Q 30/0269 |
| 2009/0063208 A1* | 3/2009 | Stirlen ................... | G06Q 10/02 |
| | | | 705/6 |
| 2015/0210287 A1* | 7/2015 | Penilla et al. ........ | B60W 40/08 |
| 2016/0071395 A1* | 3/2016 | Demeniuk ............ | G08B 21/22 |
| | | | 340/686.1 |
| 2018/0039917 A1* | 2/2018 | Buttolo ............. | G06Q 10/0631 |
| 2018/0218470 A1* | 8/2018 | Belwafa ................ | G06Q 50/30 |
| 2020/0017122 A1* | 1/2020 | Chatten ................. | G02B 27/01 |
| 2020/0019301 A1* | 1/2020 | Kolb ................... | G06F 3/04847 |

OTHER PUBLICATIONS

Volvo, Adjusting the Passenger Seat From the Driver's Seat, Jul. 22, 2018, Online Support Manual, 2018 S90 https://www.volvocars.com/au/support/manuals/s90/2017w46/seats-and-steering-wheel/front-seat/adjusting-the-passenger-seat-from-the-driver-s-seat (Year: 2018).*

Richard L. Brockmyer, Defining Successful Rideshare Programs, Report, Aug. 2010 (Year: 2010).*

\* cited by examiner

*Primary Examiner* — Kevin H Flynn
*Assistant Examiner* — Larita L. Yusuf
(74) *Attorney, Agent, or Firm* — Lorenz & Kopf LLP

(57) ABSTRACT

One general aspect includes a method to establish control of one or more rideshare experience features, the method including: receiving, via a processor, seat preference settings; based on the seat preference settings, via the processor, designating one vehicle seat of a plurality of vehicle seats; and enabling, via the processor, control of one or more rideshare experience features associated with the designated seat through at least one control panel located at the designated seat.

20 Claims, 3 Drawing Sheets

SYSTEM AND METHOD TO ESTABLISH PRIMARY AND SECONDARY CONTROL OF RIDESHARE EXPERIENCE FEATURES

INTRODUCTION

In the rideshare environment, vehicle passengers may travel with a friend or family member. In some instances, this friend/family member is somehow physically or mentally disabled and cannot make adjustments to their seat or any comfort settings on their own. Furthermore, if the passenger wants to help make their friend/family member more comfortable, they will have to awkwardly reach around that person to access their seat and/or comfort controls. This can be burdensome for the passenger and can put them in an uncomfortable situation. In other instances, the family member can be a child that is prone to mistakenly access some of the vehicle access controls and cause safety issues or simply annoy other passengers. Thus, the passenger may need control on child's access to vehicle to prevent safety issues from occurring and/or keep their fellow passengers from being annoyed. Accessing seat and/or comfort settings in this manner can also be time consuming and can unduly delay the rideshare vehicle while picking up passengers, causing the vehicle to be late to or miss the remainder of its scheduled stops and burdening everyone traveling in the vehicle. It is therefore desirable to provide a method which allows a vehicle passenger to avoid having to manually adjust seat and/or comfort settings on behalf of a friend/family member with a physical/mental disability as well as be able to restrict children from having access to vehicle access controls (e.g., door locks). Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to establish control of one or more rideshare experience features, the method including: receiving, via a processor, seat preference settings; based on the seat preference settings, via the processor, designating one vehicle seat of a plurality of vehicle seats; and enabling, via the processor, control of one or more rideshare experience features associated with the designated seat through at least one control panel located at the designated seat. Other embodiments of this aspect include corresponding computer systems, apparatus, and computer programs recorded on one or more computer storage devices, each configured to perform the actions of the methods.

Implementations may include one or more of the following features. The method further including: sending, via a mobile computing device, the seat preference settings to a data center; updating, via the data center, a rideshare services record based on the seat preference settings; and sending to the processor, via the data center, the seat preference settings via a wireless carrier system. The method further including: sending, via the mobile computing device, a vehicle reservation request to the data center; and updating, via the data center, the rideshare services record based on the vehicle reservation request; and generating, via the data center, a vehicle reservation based on the updates to the rideshare services record; sending to the processor, via the data center, the vehicle reservation via the wireless carrier system; and where the vehicle reservation includes the seat preference settings. The method further including: recognizing, via the processor, an expiration of the vehicle reservation; and based on the expiration of the vehicle reservation, via the processor, terminating the designation of the designated seat and discontinuing control of the control panel. The method further including: validating, via the processor, one or more characteristics of an occupant in the designated seat prior to enabling control of the one or more rideshare experience features associated with the designated seat. The method where the one or more rideshare experience features are power door locks, power windows, a charging port, an HVAC system, an infotainment center, an audio component and/or speaker, and a light. Implementations of the described techniques may include hardware, a method or process, or computer software on a computer-accessible medium.

One general aspect includes a method to establish control of one or more rideshare experience features associated with a principal seat and one or more auxiliary seats, the method including: receiving, via a processor, seat preference settings; based on the seat preference settings, via the processor, designating one vehicle seat of a plurality of vehicle seats as the principal seat and one or more additional vehicle seats of the plurality of vehicle seats as the one or more auxiliary seats; and enabling, via the processor, control of one or more rideshare experience features associated with the principal seat and the one or more auxiliary seats through at least one control panel located at the principal seat. Other embodiments of this aspect include corresponding computer systems, apparatus, and computer programs recorded on one or more computer storage devices, each configured to perform the actions of the methods.

Implementations may include one or more of the following features. The method further including: sending, via a mobile computing device, the seat preference settings to a data center; updating, via the data center, a rideshare services record based on the seat preference settings; and sending to the processor, via the data center, the seat preference settings via a wireless carrier system. The method further including: sending, via the mobile computing device, a vehicle reservation request to the data center; updating, via the data center, the rideshare services record based on the vehicle reservation request; generating, via the data center, a vehicle reservation based on the updates to the rideshare services record; sending to the processor, via the data center, the vehicle reservation via the wireless carrier system; and where the vehicle reservation includes the seat preference settings. The method further including: recognizing, via the processor, an expiration of the vehicle reservation; and based on the expiration of the vehicle reservation, via the processor, terminating the designation of the principal seat and the one or more auxiliary seats as well as discontinuing control of the control panel. The method further including: validating, via the processor, one or more characteristics of an occupant in each of the one or more auxiliary seats prior to enabling control of one or more rideshare experience features associated with the one or more auxiliary seats. The method where the one or more rideshare experience features are power door locks, power windows, a charging port, an HVAC system, an infotainment center, an audio component and/or speaker, and a light. Implementations of the described techniques may include hardware, a method or process, or computer software on a computer-accessible medium.

One general aspect includes a system to establish control of one or more rideshare experience features associated with a principal seat and one or more auxiliary seats, the system including: a memory configured to include one or more executable instructions and a processor configured to execute the executable instructions, where the executable instructions enable the processor to carry out the steps of: receiving seat preference settings. The system also includes based on the seat preference settings, designating one vehicle seat of a plurality of vehicle seats as the principal seat and one or more additional vehicle seats of the plurality of vehicle seats as the one or more auxiliary seats. The system also includes enabling control of one or more rideshare experience features associated with the principal seat and the one or more auxiliary seats through at least one control panel located at the principal seat. Other embodiments of this aspect include corresponding computer systems, apparatus, and computer programs recorded on one or more computer storage devices, each configured to perform the actions of the methods.

Implementations may include one or more of the following features. The system further including: a mobile computing device configured to carry out the step of sending the seat preference settings to a data center; and the data center configured to carry out the steps of: in response to receiving the seat preference settings, updating a rideshare services record; and sending the seat preference settings to the processor via a wireless carrier system. The system further including: the mobile computing device configured to carry out the additional step of sending a vehicle reservation request to the data center; and the data center configured to carry out the additional steps of: updating the rideshare services record based on the vehicle reservation request; and generating a vehicle reservation based on the updates to the rideshare services record; and sending the vehicle reservation to the processor via the wireless carrier system. The system may also include where the vehicle reservation includes the seat preference settings. The system where the processor is configured to carry out the additional steps of: recognizing an expiration of the vehicle reservation; and based on the expiration of the vehicle reservation, terminating the designation of the principal seat and the one or more auxiliary seats as well as discontinuing control of the control panel. The system where the processor is configured to carry out the additional steps of: validating one or more characteristics of an occupant in each of the one or more auxiliary seats prior to enabling control of one or more rideshare experience features associated with the one or more auxiliary seats. The system where the one or more rideshare experience features are power door locks, power windows, a charging port, an HVAC system, an infotainment center, an audio component and/or speaker, and a light. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following detailed description is merely exemplary in nature and is not intended to limit the application and uses. Furthermore, there is no intention to be bound by any expressed or implied theory presented in the preceding background and brief summary or the following detailed description. As used herein, the term module refers to an application specific integrated circuit (ASIC), an electronic circuit, a processor (shared, dedicated, or group) and memory that executes one or more software or firmware programs or code segments, a combinational logic circuit, and/or other suitable components that provide the described functionality.

Figure 1:
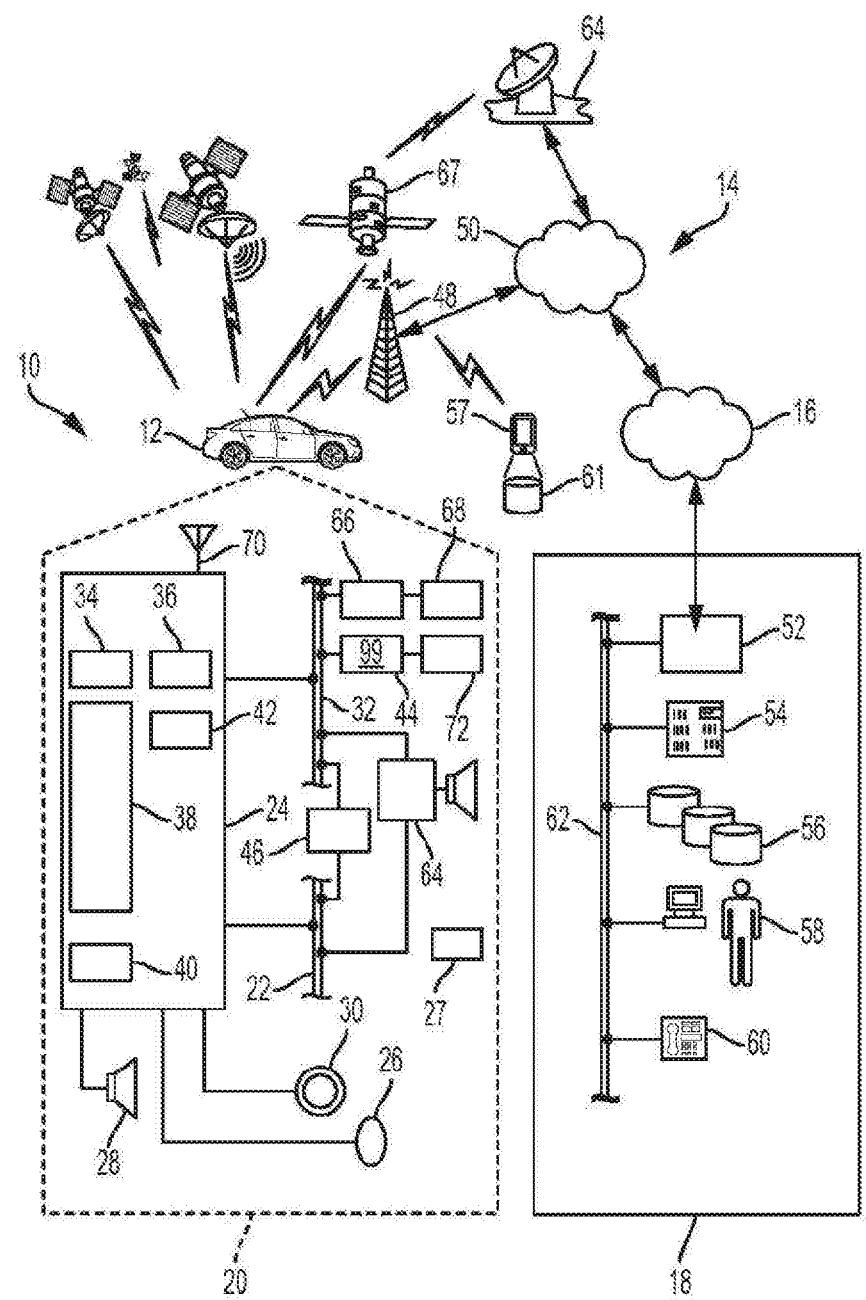
FIG. 1 is a block diagram depicting an exemplary embodiment of a communications system capable of utilizing the system and method disclosed herein.

As shown in FIG. 1, there is shown a non-limiting example of a communication system 10 that may be used together with examples of the system disclosed herein and/or to implement examples of the methods disclosed herein. Communication system 10 generally includes a vehicle 12, a wireless carrier system 14, a land network 16, and a data center 18 (i.e., the backend). It should be appreciated that the overall architecture, setup, and operation, as well as the individual components of the illustrated system are merely exemplary and that differently configured communication systems may also be utilized to implement the examples of the system and/or method disclosed herein. Thus, the following paragraphs, which provide a brief overview of the illustrated communication system 10, are not intended to be limiting.

Vehicle 12 may be any type of manually operated or autonomous vehicle such as a motorcycle, car, sports utility vehicle (SUV), truck, bus, bicycle, recreational vehicle (RV), construction vehicle (e.g., bulldozer), train, trolley, marine vessel (e.g., a boat), aircraft (e.g., airplane, helicopter, etc.), amusement park vehicle, farm equipment, golf cart, etc., and is equipped with suitable hardware and software that enables it to communicate over communication system 10. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the fundamental vehicle hardware 20 is shown generally in FIG. 1 including a telematics unit 24, a microphone 26, interior camera 27, speaker 28, and buttons and/or controls 30 connected to telematics unit 24. Operatively coupled to telematics unit 24 is a network connection or vehicle bus 32. Examples of suitable network connections include a controller area network (CAN), WIFI, Bluetooth, and Bluetooth Low Energy, a media oriented system transfer (MOST), a local interconnection network (LIN), a local area network (LAN), and other appropriate connections such as Ethernet or those that conform with known ISO (International Organization for Standardization), SAE (Society of Automotive Engineers), and/or IEEE (Institute of Electrical and Electronics Engineers) standards and specifications, to name a few.

The telematics unit 24 can be an OEM-installed (embedded) or aftermarket communication system which provides a variety of services through its communications with the data center 18, and generally includes an electronic processing device 38, one or more types of electronic memory 40, a cellular chipset/component 34, wireless modem 36, an antenna system 70 including one or more antennas, and navigation unit containing a GPS chipset/component 42 capable of communicating location information via a GPS satellite system 65. GPS component 42 thus receives coordinate signals from a constellation of GPS satellites 67, for example via network 50. From these signals, the GPS component 42 can determine vehicle position, which may be used for providing navigation and other position-related services to the vehicle operator. Navigation information can be presented on a display of telematics unit 24 (or other display within the vehicle) or can be presented verbally such as is done when supplying turn-by-turn navigation. The navigation services can be provided using a dedicated in-vehicle navigation module (that can be part of GPS component 42), or some or all navigation services can be done via telematics unit 24, wherein the location coordinate information is sent to a remote location for purposes of providing the vehicle with navigation maps, map annotations, route calculations, and the like.

The telematics unit 24 may provide various services including: turn-by-turn directions, map-based directions, and other navigation-related services provided in conjunction with the GPS component 42; airbag deployment notification and other emergency or roadside assistance-related services provided in connection with various crash and/or collision sensor interface modules 66 and collision sensors 68 located throughout the vehicle and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. It should be understood that an independent infotainment center 46 may be located at each vehicle seat within vehicle 12, such that each vehicle occupant has control of their own infotainment-related services. The above-listed services are by no means an exhaustive list of all the capabilities of telematics unit 24, but are simply an illustration of some of the services telematics unit 24 may be capable of offering. It is anticipated that telematics unit 24 may include a number of additional components in addition to and/or different components from those listed above.

Vehicle communications may use radio transmissions to establish a communication channel (voice channel and/or data channel) with wireless carrier system 14 so that both voice and/or data transmissions can be sent and received over the channel. Vehicle communications are enabled via the cellular component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc. To accomplish this effect, dual mode antenna 70 services the GPS component 42 and the cellular component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to one or more vehicle occupants and can be either a stand-alone speaker specifically dedicated for use with the telematics unit 24 or can be part of a vehicle audio component 64. In either event, microphone 26 and speaker 28 enable vehicle hardware 20 and data center 18 to communicate with the occupants through audible speech. Moreover, microphone 26 and speaker 28 can be considered one of multiple microphones 26 and speakers 28 installed within vehicle 12, each of which being located at a respective vehicle seat within vehicle 12. The vehicle hardware also includes a camera 27 installed in the interior of vehicle 12 that can be angled to view and digitally record images of the vehicle seats as well as any occupants in the seats. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with data center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, satellite radio, compact disc (CD), digital video disc (DVD), and multimedia functionality independent of the infotainment center 46. Audio component 64 may contain a speaker system (having at least one speaker assigned to each vehicle seat), or may utilize speaker 28 via arbitration on vehicle bus 32 and/or audio bus 22.

The vehicle crash and/or collision detection sensor interface 66 is operatively connected to the vehicle bus 32. The collision sensors 68 provide information to telematics unit 24 via the crash and/or collision detection sensor interface 66 regarding the severity of a vehicle collision, such as the angle of impact and the amount of force sustained.

Vehicle sensors 72, connected to various vehicle sensor modules 44 (VSMs) in the form of electronic hardware components located throughout vehicle 12 and use the sensed input to perform diagnostic, monitoring, control, reporting and/or other functions. Each of the VSMs 44 is preferably connected by vehicle bus 32 to the other VSMs, as well as to the telematics unit 24, and can be programmed to run vehicle system and subsystem diagnostic tests. As examples, one VSM 44 can be an engine control module (ECM) that controls various aspects of engine operation such as fuel ignition and ignition timing. According to one embodiment, the ECM is equipped with on-board diagnostic (OBD) features that provide myriad real-time data, such as that received from various sensors including vehicle emissions sensors, fuel diagnostics sensors, and vehicle oil pressure sensors as well as provide a standardized series of diagnostic trouble codes (DTCs) which allow a technician to rapidly identify and remedy malfunctions within the vehicle. VSM 44 can similarly be a powertrain control module (PCM) that regulates operation of one or more components of the powertrain system. Another VSM 44 can be a body control module (BCM) that monitors and governs various electrical components located throughout the vehicle body like the vehicle's power door locks, power windows, HVAC system (air conditioner and heating), ambient lighting within the vehicle interior, smart device charging ports (e.g., an IPHONE™ or ANDROID™ charging port), one or more control panels 99, tire pressure, one or more seat weight sensors, lighting system, engine ignition, vehicle seat adjustment and heating, mirrors, and headlights. Furthermore, as can be appreciated by skilled artisans, the above-mentioned VSMs are only examples of some of the modules that may be used in vehicle 12, as numerous others are also possible. Each control panel 99 can be a cluster of vehicle switches located at a corresponding seat within vehicle 12, for example at an armrest of the vehicle seat. Moreover, the switches of the vehicle switch cluster control panel 99 can be enabled to control certain vehicle experience features such as, for example, the infotainment center(s) 46 located at each vehicle seat, each power window of the vehicle 12, audio component 64 and/or speaker 28, infotainment center 46, the charging port located at each vehicle seat, and the ambient lighting related to each vehicle seat.

A passive entry passive start (PEPS) module, for instance, is another of the numerous of VSMs and provides passive detection of the absence or presence of a passive physical key or a virtual vehicle key. When the passive physical key approaches, the PEPS module can determine if the passive physical key is authentic as belonging to the vehicle 12. The PEPS can likewise use authentication information received from data center 18 to determine if a mobile computing device 57 with virtual vehicle key is authorized/authentic to vehicle 12. If the virtual vehicle key is deemed authentic, the PEPS can send a command to BCM 44 permitting access to the vehicle 12. The PEPS can also provide passive entry health information to ensure sufficient module functionality for the passive physical key or virtual vehicle key operations. It should be understood that the PEPS may be an electronic hardware component connected to the vehicle bus 32 or, in an alternative embodiment, may be one or more software code segments uploaded to electronic memory 40.

Wireless carrier system 14 may be a cellular telephone system or any other suitable wireless system that transmits signals between the vehicle hardware 20 and land network 16. According to an example, wireless carrier system 14 includes one or more cell towers 48 (only one shown), one or more cellular network infrastructures (CNI) (not shown), as well as any other networking components required to connect wireless carrier system 14 with land network 16.

Land network 16 can be a conventional land-based telecommunications network connected to one or more landline telephones, and that connects wireless carrier system 14 to data center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

As revealed above, one of the networked devices that can directly or indirectly communicate with the telematics unit 24 is a mobile computing device 57, such as (but not limited to) a smart phone, personal laptop computer or tablet computer having two-way communication capabilities, a wearable computer such as (but not limited to) a smart watch or glasses, or any suitable combinations thereof. The mobile computing device 57 can include computer processing capability, a mobile memory 61, and a transceiver capable of communicating with remote locations (e.g., data center 18), amongst other features. Examples of the mobile computing device 57 include the IPHONE™ and APPLE WATCH™ each being manufactured by Apple, Inc., and the GALAXY™ smart phone manufactured by Samsung Electronics Company as well as others.

Mobile device 57 may be used inside or outside of a vehicle, and may be coupled to the vehicle by wire or wirelessly. Mobile device 57 may also be configured to provide services according to a subscription agreement with a third-party facility or wireless/telephone service provider. It should be appreciated that various service providers may utilize the wireless carrier system 14 and that the service provider of telematics unit 24 may not necessarily be the same as the service provider of mobile device 57.

When using a short-range wireless connection (SRWC) protocol (e.g., Bluetooth Low Energy, Wi-Fi, etc.), mobile computing device 57 and telematics unit 24 may pair with each other (or link to one another) on a case-by-case basis and while within a wireless range; SRWC pairing is known to skilled artisans. The SRWC protocol may be an aspect of telematics unit 24 or may be part of one or more independent VSMs 44 such as the PEPS and/or BCM 44. Once SRWC is established, the devices may be considered bonded (i.e., they may recognize one another and/or connect automatically when they are in a predetermined proximity or range of one other. In other words—they may become, at least temporarily, network participants).

This unique pairing, for example, allows mobile computing device 57 to act as the virtual key fob briefly mentioned above. To illustrate how this occurs—upon receiving a request, data center 18 will generate an encrypted virtual vehicle key to permit vehicle access via mobile computing device 57. Data center 18 will then transmit aspects this encrypted virtual vehicle key information to both mobile computing device 57 and the PEPS module 44 via telematics unit 24. After paring has been established, mobile computing device 57 will send its virtual vehicle key aspect to telematics unit 24 for recognition in light of its stored corresponding virtual key aspect and in turn the PEPS module may establish mobile computing device 57 as the acting key fob for vehicle 12. Data center 18 may also transmit one or more time parameters with the encrypted virtual vehicle key information so as to temporarily establish the virtual vehicle key of mobile device 57.

Data center 18 is designed to provide the vehicle hardware 20 with a number of different system backend functions and, according to the example shown here, generally includes one or more switches 52, servers 54, databases 56, advisors 58, one or more fleet managers, as well as a variety of other telecommunication/computer equipment 60. These various data center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58, or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. Although the illustrated example has been described as it would be used in conjunction with a manned data center 18, it will be appreciated that the data center 18 can be any central or remote facility, manned or unmanned, mobile or fixed, to or from which it is desirable to exchange voice and data.

Server 54 can incorporate a data controller which essentially controls its operations. Server 54 may control data information as well as act as a transceiver to send and/or receive the data information (i.e., data transmissions) from one or more of the databases 54, telematics unit 24, and mobile computing device 57. The controller is moreover capable of reading executable instructions stored in a non-transitory machine readable medium and may include one or more from among a processor, microprocessor, central processing unit (CPU), graphics processor, Application Specific Integrated Circuits (ASICs), Field-Programmable Gate Arrays (FPGAs), state machines, and a combination of hardware, software, and firmware components.

Database 56 could be designed to store information in the form of executable instructions such as, but not limited to, one or more application program interface (API) suites. One API suite can incorporate numerous rideshare services records (i.e., vehicle reservation information) having information related to vehicle 12 such as, but not limited to, the rideshare vehicle information (e.g., vehicle VSM information, vehicle system verification information/alerts, vehicle anomaly information), information related to the user such as, but not limited to, reservation account information (e.g., vehicle comfort settings information, seat preference settings, driving record information, telematics unit settings, or vehicle make-model preferences), and information related to organizing vehicle reservations as well as fleet management such as, but not limited to, reservation profile information (e.g., reservation calendar information, vehicle assignment information, etc.); or any other pertinent vehicle-share system information. These records could moreover be written in SQL as well as be copied, organized, and/or stored in a tabular form to allow for continuous, real-time updates. The records may be accessible to the user, data center 18, or one or more third parties (e.g., fleet manager 74). The vehicle-share records can additionally collaborate with a reservation account (discussed below) for support of, for example, reservation management and fleet management.

The user of mobile computing device 57 may create their own personalized vehicle reservation account to be stored in mobile memory 61 and which may have access to the vehicle-share records at the backend. The user may perform tasks to create this account through a variety of frontend devices such as, for example, through a remote computer and mobile computing device 57. This reservation account may be uploaded to or accessible on server 54 (i.e., to support backend functions).

The reservation account may include validating data to verify and/or validate that future login attempts are secure (e.g., granting access only to the user). The validating data may include an account username and account password as well as user information (e.g., driver's license information), mobile computing device information such as, for example, the unique mobile device identifier (i.e., serial number). The user account may additionally store a variety of user preferences.

The user of mobile device 57 may visit an online software application store or web-service and download the reservation account therefrom. The reservation account may moreover include one or more prompts to instruct the user to provide information (e.g., validating data) to support account creation. Reservation account may also provide one or more prompts to assist a rideshare system user in reserving a fleet vehicle by operatively accessing and communicating with the backend rideshare services records.

METHOD

The method or parts thereof can be implemented in a computer program product (e.g., processing device 38) embodied in a computer readable medium and including instructions usable by one or more processors of one or more computers of one or more systems to cause the system(s) to implement one or more of the method steps. The computer program product may include one or more software programs comprised of program instructions in source code, object code, executable code, or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 2:
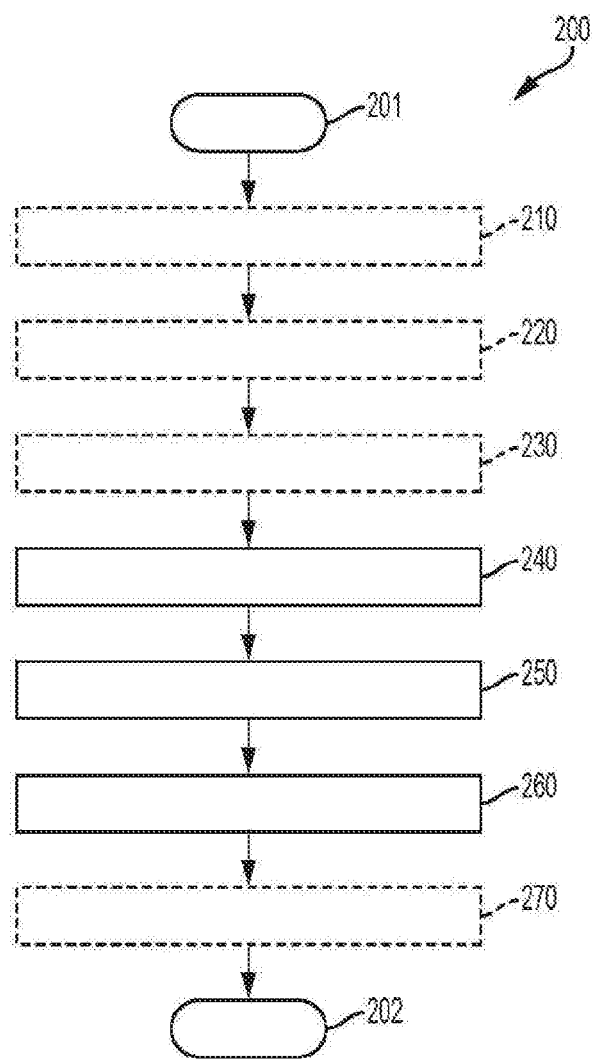
FIG. 2 is a flowchart of an exemplary process to establish control of one or more rideshare experience features.

Turning now to FIG. 2, there is shown an embodiment of a method 200 to establish control of one or more rideshare experience features associated with selected vehicle seats 100. One or more aspects of method 200 may be completed through telematics unit 24 which may include one or more executable instructions incorporated into memory device 40 and carried out by electronic processing device 38. One or more other aspects of method 200 may be completed through mobile computing device 57 which may include one or more executable instructions incorporated into mobile memory 61 and carried out by its computer processing capability. One or more other aspects of method 200 may be completed through data center 18 which may include one or more executable instructions incorporated into database 56 and carried out by server 54. One or more ancillary aspects of method 200 may be completed through one or more control panels located at a vehicle seat in the vehicle's 12 interior.

Method 200 is supported by telematics unit 24 being configured to communicate with data center 18 over wireless carrier system 14. This configuration may be made by a vehicle manufacturer at or around the time of the telematics unit's assembly or after-market (e.g., via vehicle download using the afore-described communication system 10 or at a time of vehicle service, just to name a couple of examples).

Method 200 begins at 201 in which a person choosing to reserve seats in a rideshare vehicle 12 so that the person and at least one fellow traveler will be taken from one place to another in those selected seats. As such, the person (i.e., the system user) will activate their personalized reservation account on their mobile computing device 57 to request a reservation for at least two seats within a vehicle 12 of a rideshare system. Moreover, the user will select these two or more seats within the vehicle cabin, which have been deemed to be unoccupied at the times the user requests to reserve the rideshare vehicle 12. When selecting these seats, the user will identify one seat as the prime seat (i.e., a principal seat) and the other selected seat(s) as the secondary seat(s) (i.e., auxiliary seats). After selection of these seats and designation of the prime and secondary seats, the reservation account will at least temporarily store these seat preference settings as well as other pertinent reservation information.

The seat designated as the prime seat will be provided full control of its own occupant rideshare experience features as well as full control of the rideshare experience features associated with each of the seats designated as a secondary seat. The prime seat will also be provided full access to the emergency systems for the vehicle 12 such as, for example, a panic button or hand brake (to stop the autonomous rideshare vehicle during its route). As such, the passenger sitting in primary seat will be deemed the first responder of secondary seat passenger during the vehicle ride during any personal need/emergency of secondary seat passenger/or any environmental emergency. The first responder designation may be generated as a notification exhibited on the user interface of one or more infotainment centers 46. The seat(s) designated as secondary will only be granted full or partial control of its own rideshare experience features when access has been provided by the system user (which may be via the control panel 99 at the prime seat and/or via the reservation account). Each secondary seat will also be provided full access to the emergency systems to ensure passenger safety. Moreover, when only one seat has been designated as reserved by the user (i.e., an independent seat), that independently designated seat will be provided full control of its own occupant rideshare experience features in addition to full control of the emergency systems for the vehicle 12.

In optional step 210, upon completion of the vehicle reservation request, mobile computing device 57 will wirelessly transmit the reservation request as well as the seat preference settings to server 54 via wireless carrier system 14. In optional step 220, server 54 will access and update the rideshare services records based on the reservation request and seat preference settings information. For example, with regard to record updates based upon the reservation request, server 54 will verify that the vehicle 12 has seats corresponding to the user's selected seats available in a rideshare vehicle available to take the system user and one or more fellow passengers from their chosen starting point to their chosen destination. Moreover, if a vehicle 12 is available, the server 54 will update the records (i.e., a reservation calendar) to reflect that the selected seats are reserved in the vehicle for the duration of the identified trip. With regard to record updates based upon the seat preference settings, server 54 will update the records to reflect which of the reserved seats is the designated as the prime seat and that the other reserved seats are designated as secondary seats.

In optional step 230, server 54 will compile one or more of the updated records as a vehicle reservation. The vehicle reservation will also include the seat preference settings. In step 240, at the beginning of the reservation time, or some time before the reservation is set to begin, server 54 will transmit the vehicle reservation and seat preferences to telematics unit 24 via the wireless carrier system 14. In step 250, upon receiving and processing the vehicle reservation, telematics unit 24 will set up the vehicle 12 to allow the system user and any friends included in the reservation to have access to the vehicle's cabin for the duration of the reservation times. For example, telematics unit 24 will correspond with the PEPS module 44 to authorize mobile computing device 57 to be able to lock/unlock the doors of vehicle 12 throughout the duration of the vehicle reservation.

Figure 3:
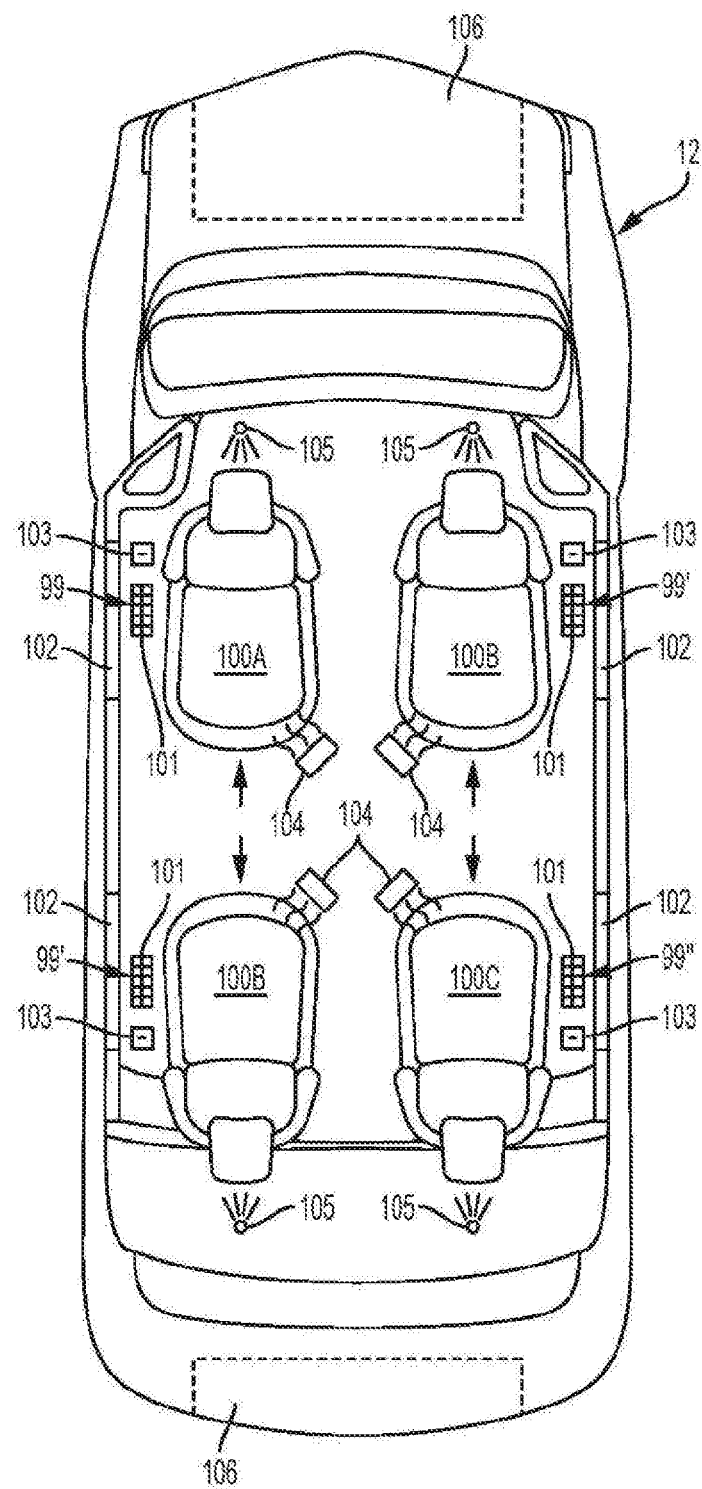
FIG. 3 depicts an application of an exemplary aspect of the process of FIG. 2 in accordance with one or more exemplary embodiments.

As can be seen with additional reference to FIG. 3, in step 260, telematics unit 24 will designate one of the reserved seats as the prime seat 100A and the other reserved seat(s) as the secondary seat(s) 100B. As such, telematics unit 24 will enable prime seat 100A full control of its occupant rideshare experience features via control panel 99 as well as full control of the rideshare experience features associated with each of the secondary seats 100B, through the same control panel 99. As follows, the control panel 99 at the prime seat 100A will be able to control the door locks 101 (including the ability to activate/deactivate child lock protections), power windows 102, smart device charging port 103, HVAC system 104, infotainment center 46, audio system 64, light 105 (e.g., ambient lighting), and access and control for any interior and exterior luggage compartments 106 assigned to the prime seat 100A and any other pertinent system operations, as well as the same rideshare experience features assigned to each of the secondary seats 100B.

In addition, telematics unit 24 will restrict control of the rideshare experience features associated with each of the secondary seats 100B. For example, telematics unit 24 will disable the control panels 99' located at each of the secondary seats 100B. Moreover, telematics unit 24 will provide the prime seat control panel 99 with the ability to reactivate the ancillary control panels 99' at one or more of the secondary seats 100B. It should be understood that telematics unit 24 will not provide the prime seat 100A with the ability to control the rideshare experience features for any of the independent seats 100C, the independent seats will have their own control panel 99" having full control of their own rideshare experience features. It should also be understood that telematics unit 24 will provide each of the prime seat 100A, secondary seat(s) 100B, and independent seat(s) with full control over the vehicle's emergency systems to ensure passenger safety.

In one or more embodiments, telematics unit 24 will only enable prime seat 100A full control of the rideshare experience features associated with a specific secondary seat 100B after the presence of a child has been validated (i.e., validating one or more characteristics of the seat occupant). For example, camera 27 may record images of the occupant in the supposed secondary seat 100B and then telematics unit 24 will use a generally known object recognition technique to verify the passenger as being a child. Alternatively, the seat weight sensor in the supposed secondary seat 100B may register that a child is sitting in the seat based on the child's weight. However, if the validation technique doesn't register a child in the seat or there are privacy concerns associated with identifying the passenger(s) in the secondary seats 100B, an alert could be sent to the occupant in primary seat 100A so that they may validate the occupant in the secondary seat 100B is supposed to be there and require additional assistance (e.g., they have a physical/mental disability). This alert may be in the form of a notification and prompt that is exhibited on the user interface of the mobile computing device 57 or on the user interface of the infotainment center 46 associated with primary seat. Verification of this nature will ensure that any unintentional control the rideshare experience features (i.e., the power door locks) will be avoided. It is also envisioned that object recognition techniques could be implemented to verify that the passenger in the supposed secondary seat 100B has an obvious impairment (e.g., their arms are in slings or casts).

In optional step 270, at some point after the beginning of the reservation time and based on the information provided in the vehicle reservation, telematics unit 24 will recognize that the vehicle reservation has expired. As such, telematics unit 24 will correspond with the PEPS module 44 to cease authorization of the mobile computing device 57 to lock/unlock the vehicle's doors. Telematics unit 24 will also terminate the designations for the prime seat 100A and each of the secondary seat(s) 100B. Therefore, the control panel 99 located at the previously designated prime seat 100A will no longer have control over the rideshare experience features of the previously designated secondary seat(s) 100B. Telematics unit 24 may also send a record of all rideshare experience features activated during the vehicle reservation to server 54 so that the rideshare services records can be updated or the information can be used for statistical purposes. After optional step 270, method 200 moves to completion 202.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to establish control of one or more rideshare experience features, the method comprising:
receiving, via a processor, a reservation request to reserve a plurality of seat reservations in a rideshare vehicle using seat preference settings, wherein the seat preference settings include a primary seat and one or more auxiliary seats;
based on the seat preference settings, via the processor, designating one vehicle seat of a plurality of vehicle seats as the primary seat, and one or more other of the plurality of vehicle seats as the auxiliary seats;
activating, via the processor, a first control panel located at the primary seat, to allow full control of the rideshare experience features associated with both the primary seat and the one or more auxiliary seats, including control of one or more vehicle systems, through the first control panel located at the primary seat; and
de-activating, via the processor, one or more second control panels located at the one or more auxiliary seats, to prevent control of the rideshare experience features, including control of one or more vehicle systems, from the second control panel located at the one or more auxiliary seats.

2. The method of claim 1, further comprising:
sending, via a mobile computing device, the seat preference settings to a data center;
updating, via the data center, a rideshare services record based on the seat preference settings; and
sending to the processor, via the data center, the seat preference settings via a wireless carrier system.

3. The method of claim 2, further comprising:
sending, via the mobile computing device, a vehicle reservation request to the data center; and
updating, via the data center, the rideshare services record based on the vehicle reservation request; and
generating, via the data center, a vehicle reservation based on the updates to the rideshare services record;
sending to the processor, via the data center, the vehicle reservation via the wireless carrier system; and
wherein the vehicle reservation comprises the seat preference settings.

4. The method of claim 3, further comprising:
recognizing, via the processor, an expiration of the vehicle reservation; and
based on the expiration of the vehicle reservation, via the processor, terminating the designation of the primary seat and discontinuing activation of the first control panel.

5. The method of claim 1, wherein the one or more rideshare experience features are power door locks, power windows, a charging port, an HVAC system, an infotainment center, an audio component and/or speaker, and a light.

6. The method of claim 1, further comprising:
determining whether an occupant of one or more of the auxiliary seats is a child;
wherein the step of activating the first control panel and deactivating the second control panel are performed only when it is determined that the occupant of one or more of the auxiliary seats is a child.

7. The method of claim 1, wherein:
the step of activating the first control panel comprises activating the first control panel located at the primary seat, to allow full control of one or more emergency systems of the vehicle, through the first control panel located at the primary seat; and
the step of deactivating the one or more second control panels comprises deactivating the one or more second control panels located at the one or more auxiliary seats, to prevent control of the one or more emergency systems of the vehicle, from the second control panel located at the one or more auxiliary seats.

8. The method of claim 7, wherein:
the step of activating the first control panel comprises activating the first control panel located at the primary seat, to allow full control of an emergency braking system of the vehicle, through the first control panel located at the primary seat; and
the step of deactivating the one or more second control panels comprises deactivating the one or more second control panels located at the one or more auxiliary seats, to prevent control of an emergency braking system of the vehicle, from the second control panel located at the one or more auxiliary seats.

9. A system to establish control of one or more rideshare experience features associated with a principal seat and one or more auxiliary seats, the system comprising:
a memory configured to comprise one or more executable instructions and a processor configured to execute the executable instructions, wherein the executable instructions enable the processor to carry out the steps of:
receiving a reservation request to reserve a plurality of seat reservations in a rideshare vehicle using seat preference settings, wherein the seat preference settings include a primary seat and one or more auxiliary seats;
based on the seat preference settings, designating one vehicle seat of a plurality of vehicle seats as the principal seat and one or more additional vehicle seats of the plurality of vehicle seats as the one or more auxiliary seats;
activating a first control panel located at the principal seat, to allow full control of the rideshare experience features associated with both the principal seat and the one or more auxiliary seats, including control of one or more vehicle systems, through the first control panel located at the principal seat; and
de-activating, via the processor, one or more second control panels located at the one or more auxiliary seats, to prevent control of the rideshare experience features, including control of one or more vehicle systems, from the second control panel located at the one or more auxiliary seats.

10. The system of claim 9, further comprising:
a mobile computing device configured to carry out the step of sending the seat preference settings to a data center; and
the data center configured to carry out the steps of:
in response to receiving the seat preference settings; updating a rideshare services record; and
sending the seat preference settings to the processor via a wireless carrier system.

11. The system of claim 10, further comprising:
the mobile computing device configured to carry out the additional step of sending a vehicle reservation request to the data center; and
the data center configured to carry out the additional steps of:
updating the rideshare services record based on the vehicle reservation request; and
generating a vehicle reservation based on the updates to the rideshare services record; and
sending the vehicle reservation to the processor via the wireless carrier system; and
wherein the vehicle reservation comprises the seat preference settings.

12. The system of claim 11, wherein the processor is configured to carry out the additional steps of:
recognizing an expiration of the vehicle reservation; and
based on the expiration of the vehicle reservation, terminating the designation of the principal seat and the one or more auxiliary seats as well as discontinuing activation of the first control panel.

13. The system of claim 9, wherein the one or more rideshare experience features are power door locks, power windows, a charging port, an HVAC system, an infotainment center, an audio component and/or speaker, and a light.

14. The system of claim 9, wherein the executable instructions further enable the processor to carry out the step of:
determining whether an occupant of one or more of the auxiliary seats is a child;

wherein the step of activating the first control panel and deactivating the second control panel are performed only when it is determined that the occupant of one or more of the auxiliary seats is a child.

15. The system of claim 9, wherein:

the step of activating the first control panel comprises activating the first control panel located at the principal seat, to allow full control of one or more emergency systems of the vehicle, through the first control panel located at the principal seat; and the step of deactivating the one or more second control panels comprises deactivating the one or more second control panels located at the one or more auxiliary seats, to prevent control of the one or more emergency systems of the vehicle, from the second control panel located at the one or more auxiliary seats.

16. The system of claim 15, wherein:

the step of activating the first control panel comprises activating the first control panel located at the principal seat, to allow full control of an emergency braking system of the vehicle, through the first control panel located at the principal seat; and the step of deactivating the one or more second control panels comprises deactivating the one or more second control panels located at the one or more auxiliary seats, to prevent control of an emergency braking system of the vehicle, from the second control panel located at the one or more auxiliary seats.

17. A rideshare vehicle comprising:

a plurality of seats;

a plurality of control panels, each control panel located at one of the plurality of seats; and a processor coupled to the plurality of control panels and configured to:

receiving, a reservation request to reserve a plurality of seat reservations in the rideshare vehicle using seat preference settings, wherein the seat preference settings include a principal seat and one or more auxiliary seats;

based on the seat preference settings, designating one vehicle seat of the plurality of vehicle seats as the principal seat and one or more additional vehicle seats of the plurality of vehicle seats as the one or more auxiliary, seats;

activating a first control panel of the plurality of control panels located at the principal seat, to allow full control of the rideshare experience features associated with both the principal seat and the one or more auxiliary seats, including control of one or more vehicle systems, through the first control panel located at the principal seat; and de-activating, via the processor, one or more second control panels located at the one or more auxiliary seats, to prevent control of the rideshare experience features, including control of one or more vehicle systems, from the second control panel located at the one or more auxiliary seats.

18. The vehicle of claim 17, wherein the processor is further configured to:

determining whether an occupant of one or more of the auxiliary seats is a child;

activating the first control panel and deactivating the second control panel only when it is determined that the occupant of one or more of the auxiliary seats is a child.

19. The vehicle of claim 17, wherein the processor is further configured to:

activating the first control panel located at the principal seat, to allow full control of one or more emergency systems of the vehicle, through the first control panel located at the principal seat; and deactivating the one or more second control panels located at the one or more auxiliary seats, to prevent control of the one or more emergency systems of the vehicle, from the second control panel located at the one or more auxiliary seats.

20. The vehicle of claim 19, wherein the processor is further configured to:

activating the first control panel located at the principal seat, to allow full control of an emergency braking system of the vehicle, through the first control panel located at the principal seat; and deactivating the one or more second control panels located at the one or more auxiliary seats, to prevent control of an emergency braking system of the vehicle, from the second control panel located at the one or more auxiliary seats.

* * * * *